United States Patent
Zhu et al.

(10) Patent No.: US 12,437,431 B2
(45) Date of Patent: Oct. 7, 2025

(54) DEPTH MAP GENERATION METHOD, AND DEVICE AND STORAGE MEDIUM

(71) Applicant: ZTE Corporation, Shenzhen (CN)

(72) Inventors: Fang Zhu, Shenzhen (CN); Yike Wang, Shenzhen (CN); Xiaobing Qian, Shenzhen (CN); Yanbin Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 393 days.

(21) Appl. No.: 18/012,785

(22) PCT Filed: Jun. 22, 2021

(86) PCT No.: PCT/CN2021/101639
§ 371 (c)(1),
(2) Date: Dec. 23, 2022

(87) PCT Pub. No.: WO2021/259287
PCT Pub. Date: Dec. 30, 2021

(65) Prior Publication Data
US 2023/0252661 A1    Aug. 10, 2023

(30) Foreign Application Priority Data
Jun. 24, 2020   (CN) .......................... 202010591582.0

(51) Int. Cl.
*G06T 7/55*    (2017.01)
(52) U.S. Cl.
CPC ...... *G06T 7/55* (2017.01); *G06T 2207/20221* (2013.01)
(58) Field of Classification Search
CPC . G06T 7/55; G06T 2207/20221; G06T 7/593; H04N 13/128; H04N 13/271; H04N 13/239; H04N 13/246
(Continued)

(56) References Cited

U.S. PATENT DOCUMENTS

| 8,705,846 B2 * | 4/2014 | Ishigami | G06T 7/55 |
| | | | 382/154 |
| 8,971,666 B2 * | 3/2015 | Yu | G06T 5/80 |
| | | | 382/293 |

(Continued)

FOREIGN PATENT DOCUMENTS

| CN | 105869167 A | 8/2016 |
| CN | 106504284 A | 3/2017 |

(Continued)

OTHER PUBLICATIONS

European Search Report for corresponding application EP21830016; Report dated Nov. 8, 2023.

(Continued)

*Primary Examiner* — Kathleen Y Dulaney
(74) *Attorney, Agent, or Firm* — CANTOR COLBURN LLP (57) ABSTRACT

Provided are a depth map generation method, a device and a storage medium, which belong to the technical field of image processing. The method includes: generating, according to a first spherical image acquired by a first fisheye lens and a second spherical image acquired by a second fisheye lens, a first disparity map of a spatial region where a terminal device is located; generating a second disparity map of the spatial region according to depth information of the spatial region acquired by an active depth sensor; and generating a target depth map of the spatial region according to the first disparity map and the second disparity map.

17 Claims, 3 Drawing Sheets

(58) Field of Classification Search
USPC .................................................. 382/154, 106
See application file for complete search history.

(56) References Cited

U.S. PATENT DOCUMENTS

| | | | | |
|---|---|---|---|---|
| 10,595,004 | B2* | 3/2020 | Kim | ..................... H04N 23/698 |
| 11,574,484 | B1* | 2/2023 | Linzer | ..................... G06T 7/521 |
| 2017/0127045 | A1 | 5/2017 | Lin | |
| 2017/0150122 | A1* | 5/2017 | Cole | ..................... H04N 13/271 |
| 2018/0262687 | A1* | 9/2018 | Hildreth | ............... H04N 13/204 |
| 2018/0278916 | A1* | 9/2018 | Kim | ..................... G03B 37/04 |
| 2019/0004535 | A1* | 1/2019 | Huang | ................ H04N 13/254 |
| 2019/0007590 | A1* | 1/2019 | Lee | ..................... H04N 13/243 |
| 2019/0026958 | A1* | 1/2019 | Gausebeck | ............. G06T 7/579 |
| 2019/0158813 | A1* | 5/2019 | Rowell | ................ H04N 13/111 |
| 2019/0273909 | A1* | 9/2019 | Ye | ........................... G06T 7/579 |
| 2019/0306419 | A1* | 10/2019 | Kajiwara | ............. G06V 20/20 |
| 2020/0025873 | A1* | 1/2020 | Kubertschak | ......... G01S 17/931 |
| 2020/0128225 | A1* | 4/2020 | Ge | ........................ G06F 18/251 |
| 2020/0134848 | A1* | 4/2020 | El-Khamy | ............. H04N 23/45 |
| 2020/0302682 | A1* | 9/2020 | Aksoy | ................... G06T 19/006 |
| 2021/0082086 | A1* | 3/2021 | Bichu | ....................... G06T 5/80 |
| 2021/0099686 | A1* | 4/2021 | Panchagnula | ........ H04N 19/597 |
| 2021/0407037 | A1* | 12/2021 | Varekamp | ............... G06T 7/593 |
| 2023/0004218 | A1* | 1/2023 | Zhang | ..................... G06F 3/013 |
| 2023/0130478 | A1* | 4/2023 | Zhang | ..................... G06T 7/593 |
| | | | | 382/106 |

FOREIGN PATENT DOCUMENTS

| | | |
|---|---|---|
| CN | 108288292 A | 7/2018 |
| CN | 110335211 A | 10/2019 |
| CN | 111028285 A | 4/2020 |
| WO | 2018026951 A1 | 2/2018 |

OTHER PUBLICATIONS

International Search Report for corresponding application PCT/CN2021/101639 filed Jun. 22, 2021; Mail date Dec. 30, 2021.
Chinese Office Action; Application No. 202010591582.0; Filing Date: Jun. 24, 2020; Date of mailing: Apr. 9, 2025; 19 pages.

* cited by examiner

DEPTH MAP GENERATION METHOD, AND DEVICE AND STORAGE MEDIUM

CROSS-REFERENCE TO RELATED APPLICATION

The present disclosure claims priority to Chinese Patent Application No. CN202010591582.0, filed on Jun. 24, 2020, and entitled "Depth Map Generation Method, Device and Storage Medium", the disclosure of which is hereby incorporated by reference in its entirety.

TECHNICAL FIELD

The disclosure relates to the technical field of image processing, and particularly to a depth map generation method, a device and a storage medium.

BACKGROUND

Rapid development of science and technology keeps broadening an application range of 3-dimension (3D) visual perception (that is, depth information perception within a visual range) technology in life. For example, the mobile augmented reality (AR) head-mounted device plays a vital role in popularity of 3D technology. As an important basis for fine structure perception and object surface understanding, the dense depth map is a 3D perception based key technology of AR and is of great significance to AR devices. In the case of most mobile AR head-mounted devices, an active sensor and a passive sensor are generally used to detect and obtain depth information in a field of view (FOV), and then the data of the active sensor and the passive sensor are fused to obtain a dense depth map. However, since the existing active sensor typically has a FOV of 65°×40°, and the passive sensor has a FOV of 69°×42°, the dense depth map obtained by fusing the data of the active sensor and the passive sensor has a small FOV, which does not satisfy the development requirement of display technology.

SUMMARY

The main objective of the disclosure is to provide a depth map generation method, a device and a storage medium, which aim to improve a field of view of a depth map.

In a first aspect, an embodiment of the disclosure provides a depth map generation method. The method is applied to a terminal device, the terminal device includes a first fisheye lens, a second fisheye lens and an active depth sensor, and the method includes:

generating, according to a first spherical image acquired by the first fisheye lens and a second spherical image acquired by the second fisheye lens, a first disparity map of a spatial region where the terminal device is located;

generating a second disparity map of the spatial region according to depth information of the spatial region acquired by the active depth sensor; and generating a target depth map of the spatial region according to the first disparity map and the second disparity map.

In a second aspect, an embodiment of the disclosure provides a terminal device. The depth map generation device includes a first fisheye lens, a second fisheye lens, an active depth sensor, a processor, a memory, a computer program stored on the memory and capable of being executed by the processor, and a data bus configured to implement communication between the processor and the memory, and the computer program implements steps of any one of the depth map generation methods provided in the description of the disclosure when executed by the processor.

In a third aspect, an embodiment of the disclosure provides a storage medium. The storage medium is used for computer-readable storage, the storage medium stores one or more programs, and the one or more programs are capable of being executed by one or more processors, so as to implement steps of any one of the depth map generation methods provided in the description of the disclosure.

DETAILED DESCRIPTION OF THE EMBODIMENTS

Technical solutions in embodiments of the disclosure will be clearly and completely described below in combination with accompanying drawings in the embodiments of the disclosure. Apparently, the described embodiments are merely some embodiments rather than all embodiments of the disclosure. On the basis of embodiments of the disclosure, all other embodiments obtained by those of ordinary skill in the art without making creative efforts fall within the scope of protection of the disclosure.

Flow diagrams shown in accompanying drawings are merely illustrative, and it is not necessary to include all contents and operations/steps or execute the operations/steps in a described order. For instance, some operations/steps can be decomposed, combined or partially combined, such that an actual execution order may be changed according to actual conditions.

It should be understood that terms used in the description of the disclosure are merely for the purpose of describing specific embodiments and are not intended to limit the disclosure. Singular forms such as "a", "an" and "the" used in the description of the disclosure and the appended claims are intended to include plural forms, unless otherwise clearly stated in the context.

Figure 1:
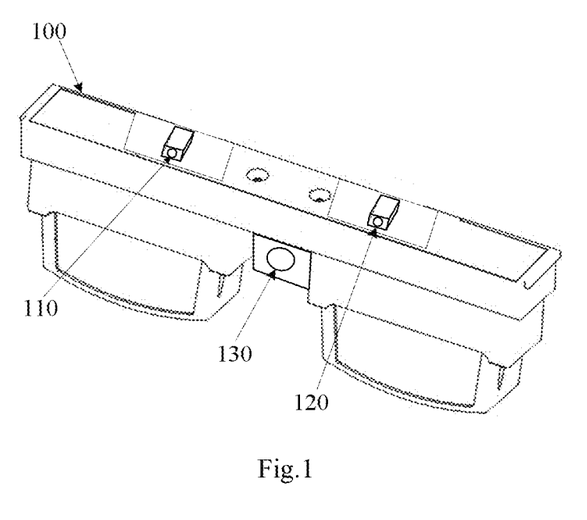
FIG. 1 is a schematic structural diagram of a terminal device for implementing a depth map generation method provided in an embodiment of the disclosure.

An embodiment of the disclosure provides a depth map generation method, a device and a storage medium. The depth map generation method may be applied to a terminal device. With reference to FIG. 1, a schematic structural diagram of a terminal device for implementing a depth map generation method provided in an embodiment of the disclosure is shown in FIG. 1. As shown in FIG. 1, the terminal device 100 includes a first fisheye lens 110, a second fisheye lens 120 and an active depth sensor 130. Installation positions of the first fisheye lens 110, the second fisheye lens 120 and the active depth sensor 130 on the terminal device, a distance between the first fisheye lens 110 and the second fisheye lens 120, and fields of view of the first fisheye lens 110 and the second fisheye lens 120 may be set according to actual conditions, and are not specifically limited in embodiments of the disclosure. For example, a distance between the first fisheye lens 110 and the second fisheye lens 120 is 5 cm or 10 cm, and fields of view of the first fisheye lens 110 and the second fisheye lens 120 are both 150°×180° or 210°×180°. In an embodiment, the terminal device may be an augmented reality (AR) head-mounted device.

It should be understood that the terminal device 100 in FIG. 1 and the above names of various components of the terminal device 100 are merely for an identification purpose, and do not limit embodiments of the disclosure.

Some embodiments of the disclosure will be described in detail in combination with accompanying drawings. The following examples and features in the embodiments can be combined with each other without conflict.

Figure 2:
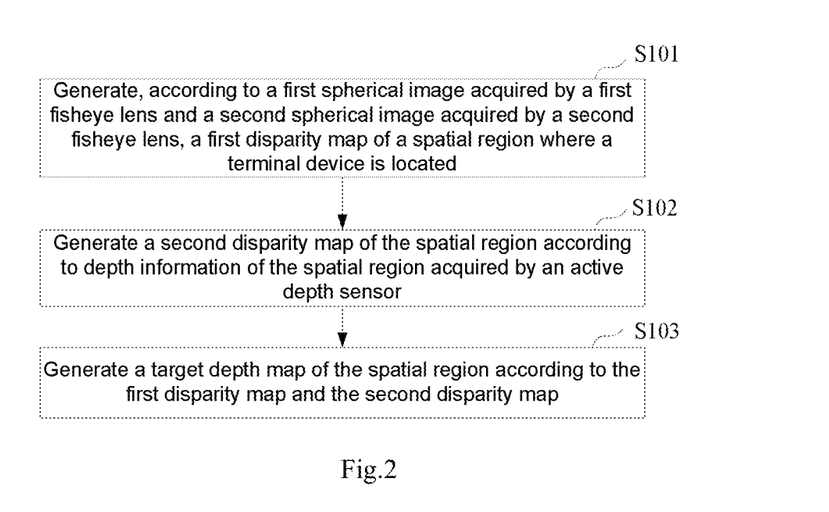
FIG. 2 is a schematic flow diagram of a depth map generation method provided in an embodiment of the disclosure.

With reference to FIG. 2, a schematic flow diagram of a depth map generation method provided in an embodiment of the disclosure is shown in FIG. 2.

As shown in FIG. 2, the depth map generation method includes steps S101 to S103.

S101: generate, according to a first spherical image acquired by a first fisheye lens and a second spherical image acquired by a second fisheye lens, a first disparity map of a spatial region where a terminal device is located.

The depth map generation method is applied to a terminal device. The terminal device includes a first fisheye lens, a second fisheye lens and an active depth sensor. The active depth sensor includes a time of flight (TOF) sensor, a structured light sensor, a laser radar (lidar), etc. A distance between the first fisheye lens and the second fisheye lens, and fields of view of the first fisheye lens and the second fisheye lens may be set according to actual conditions, and are not specifically limited in embodiments of the disclosure. For example, a distance between the first fisheye lens and the second fisheye lens is 8 cm, and fields of view of the first fisheye lens and the second fisheye lens are both 145°×180°.

In an embodiment, an image of the spatial region is acquired by the first fisheye lens to obtain the first spherical image, and an image of the spatial region is acquired by the second fisheye lens to obtain the second spherical image.

Figure 3:
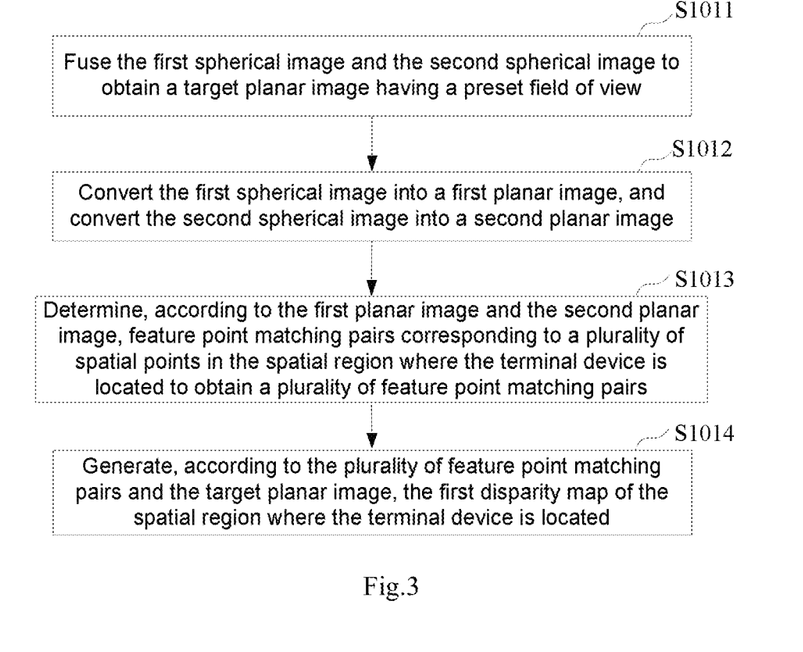
FIG. 3 is a schematic flow diagram of sub-steps of the depth map generation method in FIG. 2.

In an embodiment, as shown in FIG. 3, the step S101 includes sub-steps S1011 to S1014.

S1011: fuse the first spherical image and the second spherical image to obtain a target planar image having a preset field of view.

The first spherical image and the second spherical image are curved surface images, and the first spherical image and the second spherical image are converted from the curved surface images into planar images each having a preset field of view to obtain the target planar image having a preset field of view. The preset field of view may be set according to actual conditions, and is not specifically limited in embodiments of the disclosure. For example, the preset field of view may be set to be 150°×180°.

In an embodiment, the first spherical image is converted into a first three-dimensional image, the first three-dimensional image including a forward mapping image, a leftward mapping image, a rightward mapping image, an upward mapping image, and a downward mapping image of the first spherical image. The second spherical image is converted into a second three-dimensional image, the second three-dimensional image including a forward mapping image, a leftward mapping image, a rightward mapping image, an upward mapping image, and a downward mapping image of the second spherical image. The first three-dimensional image and the second three-dimensional image are fused to obtain the target planar image having a preset field of view. By converting the first spherical image and the second spherical image into three-dimensional images, and fusing the two three-dimensional images, the target planar image having a preset field of view may be obtained, such that it is convenient to subsequently generate a depth map having a large field of view on the basis of the planar image having a large field of view.

In an embodiment, a method of converting the first spherical image into a first three-dimensional image may include: normalize the first spherical image to obtain a normalized spherical surface of the first spherical image, split the normalized spherical surface of the first spherical image into a forward mapping image, a leftward mapping image, a rightward mapping image, an upward mapping image and a downward mapping image, and splice the forward mapping image, the leftward mapping image, the rightward mapping image, the upward mapping image and the downward mapping image of the first spherical image to obtain the first three-dimensional image; and similarly, normalize the second spherical image to obtain a normalized spherical surface of the second spherical image, split the normalized spherical surface of the second spherical image into a forward mapping image, a leftward mapping image, a rightward mapping image, an upward mapping image and a downward mapping image, and splice the forward mapping image, the leftward mapping image, the rightward mapping image, the upward mapping image and the downward mapping image of the second spherical image to obtain the second three-dimensional image.

In an embodiment, a method of fusing the first three-dimensional image and the second three-dimensional image to obtain the target planar image having a preset field of view may include: splice the forward mapping image, the leftward mapping image and the rightward mapping image of the first three-dimensional image to obtain a first image having a preset field of view; splice the forward mapping image, the leftward mapping image and the rightward mapping image of the second three-dimensional image to obtain a second image having a preset field of view; fuse the first image and the second image to obtain a first fused image, and fuse the upward mapping image of the first three-dimensional image and the upward mapping image of the second three-dimensional image to obtain a second fused image; fuse the downward mapping image of the first three-dimensional image and the downward mapping image of the second three-dimensional image to obtain a third fused image; and splice the first fused image, the second fused image and the third fused image to obtain the target planar image having a preset field of view.

In an embodiment, a method of fusing the first image and the second image to obtain a first fused image may include: fuse the first image and the second image on the basis of an image fusion algorithm to obtain the first fused image. Similarly, the upward mapping image of the first three-dimensional image and the upward mapping image of the second three-dimensional image may be fused on the basis of the image fusion algorithm to obtain the second fused image; and the downward mapping image of the first three-dimensional image and the downward mapping image of the second three-dimensional image may be fused on the basis of the image fusion algorithm to obtain the third fused image. The image fusion algorithm includes a wavelet transform based image fusion algorithm and a pyramid decomposition based image fusion algorithm.

Figure 4:
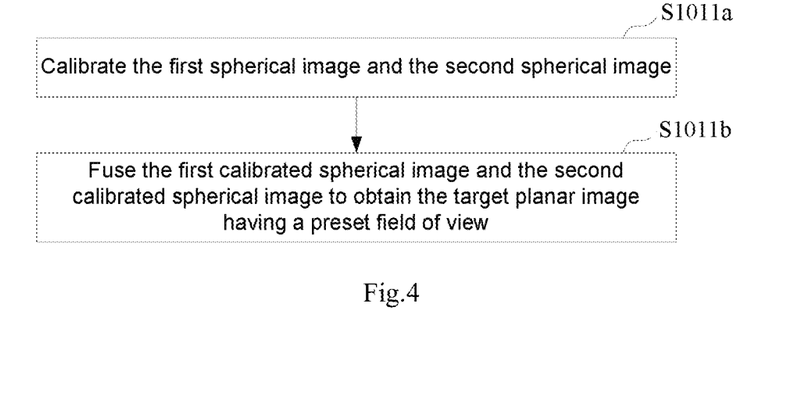
FIG. 4 is a schematic flow diagram of sub-steps of the depth map generation method in FIG. 3.

In an embodiment, as shown in FIG. 4, the step S1011 includes sub-steps S1011a and S1011b.

S1011a: calibrate the first spherical image and the second spherical image.

When the first spherical image and the second spherical image are acquired by the first fisheye lens and the second fisheye lens, since jitter of the terminal device or motion of an object in a picture cause distortion of the acquired first spherical image and the acquired second spherical image, which further cause anamorphose of the first spherical image and the second spherical image, it is required to calibrate the first spherical image and the second spherical image.

In an embodiment, a method of calibrating the first spherical image and the second spherical image may include: convert the first spherical image into a third three-dimensional image, and convert the second spherical image into a fourth three-dimensional image; determine, according to the third three-dimensional image and the fourth three-dimensional image, feature point matching pairs corresponding to a plurality of spatial points in the spatial region where the terminal device is located to obtain a plurality of feature point matching pairs; remove abnormal feature point matching pairs from the plurality of feature point matching pairs to obtain a plurality of target feature point matching pairs; and calibrate the first spherical image and the second spherical image according to the plurality of target feature point matching pairs. A method of removing abnormal feature point matching pairs from the plurality of feature point matching pairs to obtain a plurality of target feature point matching pairs may include: obtain a preset mathematical model, and remove abnormal feature point matching pairs from the plurality of feature point matching pairs on the basis of the preset mathematical model to obtain a plurality of target feature point matching pairs. The preset mathematical model is determined on the basis of a random sample consensus (RANSAC) algorithm. By calibrating the first spherical image and the second spherical image, it is convenient to subsequently generate an accurate disparity map on the basis of the first calibrated spherical image and the second calibrated spherical image.

In an embodiment, a method of converting the first spherical image into a third three-dimensional image, and converting the second spherical image into a fourth three-dimensional image may include: normalize the first spherical image to obtain a normalized spherical surface of the first spherical image, split the normalized spherical surface of the first spherical image into a forward mapping image, a leftward mapping image, a rightward mapping image, an upward mapping image and a downward mapping image, and splice the forward mapping image, the leftward mapping image, the rightward mapping image, the upward mapping image and the downward mapping image of the first spherical image to obtain the third three-dimensional image; and similarly, normalize the second spherical image to obtain a normalized spherical surface of the second spherical image, split the normalized spherical surface of the second spherical image into a forward mapping image, a leftward mapping image, a rightward mapping image, an upward mapping image, and a downward mapping image, and splice the forward mapping image, the leftward mapping image, the rightward mapping image, the upward mapping image, and the downward mapping image of the second spherical image to obtain the fourth three-dimensional image.

In an embodiment, a method of determining, according to the third three-dimensional image and the fourth three-dimensional image, feature point matching pairs corresponding to a plurality of spatial points in the spatial region where the terminal device is located to obtain a plurality of feature point matching pairs may include: extract, on the basis of a feature point extraction algorithm, feature points corresponding to a plurality of spatial points in the spatial region where the terminal device is located from the third three-dimensional image to obtain a plurality of first feature points; extract, on the basis of the feature point extraction algorithm, feature points corresponding to a plurality of spatial points in the spatial region where the terminal device is located from the fourth three-dimensional image to obtain a plurality of second feature points; and match each of the plurality of first feature points with one of the plurality of second feature points on the basis of a feature point matching algorithm to obtain a plurality of feature point matching pairs, one feature point matching pair including one first feature point and one second feature point. The feature point extraction algorithm and the feature point matching algorithm may be selected according to actual conditions, and are not specifically limited in embodiments of the disclosure. For example, the feature point extraction algorithm includes at least one of a Harris corner detection algorithm, a scale-invariant feature transform (SIFT) algorithm, a speeded-up robust features (SURF) algorithm, and a features from accelerated segment test (FAST) feature point detection algorithm; and the feature point matching algorithm includes at least one of a Kanade-Lucas-Tomasi (KLT) feature tracker algorithm and a brute-force matching algorithm.

In an embodiment, a method of determining, according to the third three-dimensional image and the fourth three-dimensional image, feature point matching pairs corresponding to a plurality of spatial points in the spatial region where the terminal device is located to obtain a plurality of feature point matching pairs may include: convert the third three-dimensional image into a third planar image, that is, extend and splice the forward mapping image, the leftward mapping image, the rightward mapping image, the upward mapping image and the downward mapping image of the third three-dimensional image to obtain the third planar image; convert the fourth three-dimensional image into a fourth planar image, that is, extend and splice the forward mapping image, the leftward mapping image, the rightward mapping image, the upward mapping image and the downward mapping image of the fourth three-dimensional image to obtain the fourth planar image; extract, on the basis of a feature point extraction algorithm, feature points corresponding to a plurality of spatial points in the spatial region where the terminal device is located from the third planar image to obtain a plurality of first feature points; extract, on the basis of the feature point extraction algorithm, feature points corresponding to a plurality of spatial points in the spatial region where the terminal device is located from the fourth planar image to obtain a plurality of second feature points; and match each of the plurality of first feature points with one of the plurality of second feature points on the basis of a feature point matching algorithm to obtain a plurality of feature point matching pairs, one feature point matching pair including one first feature point and one second feature point.

S1011b: fuse the first calibrated spherical image and the second calibrated spherical image to obtain the target planar image having a preset field of view.

In an embodiment, the first calibrated spherical image is converted into a first three-dimensional image, the first three-dimensional image including a forward mapping image, a leftward mapping image, a rightward mapping image, an upward mapping image and a downward mapping image of the first calibrated spherical image. The second calibrated spherical image is converted into a second three-dimensional image, the second three-dimensional image including a forward mapping image, a leftward mapping image, a rightward mapping image, an upward mapping image and a downward mapping image of the second calibrated spherical image. The first three-dimensional image and the second three-dimensional image are fused to obtain the target planar image.

In an embodiment, a method of converting the first calibrated spherical image into a first three-dimensional image may include: normalize the first calibrated spherical image to obtain a normalized spherical surface of the first calibrated spherical image, split the normalized spherical surface of the first calibrated spherical image into a forward mapping image, a leftward mapping image, a rightward mapping image, an upward mapping image and a downward mapping image, and splice the forward mapping image, the leftward mapping image, the rightward mapping image, the upward mapping image and the downward mapping image of the first calibrated spherical image to obtain the first three-dimensional image; and similarly, normalize the second calibrated spherical image to obtain a normalized spherical surface of the second calibrated spherical image, split the normalized spherical surface of the second calibrated spherical image into a forward mapping image, a leftward mapping image, a rightward mapping image, an upward mapping image and a downward mapping image, and splice the forward mapping image, the leftward mapping image, the rightward mapping image, the upward mapping image and the downward mapping image of the second calibrated spherical image to obtain the second three-dimensional image.

S1012: convert the first spherical image into a first planar image, and convert the second spherical image into a second planar image.

The first spherical image is converted into a three-dimensional image, the three-dimensional image including a forward mapping image, a leftward mapping image, a rightward mapping image, an upward mapping image and a downward mapping image of the first spherical image; the forward mapping image, the leftward mapping image and the rightward mapping image of the three-dimensional image are spliced to obtain a first image; and the upward mapping image and the downward mapping image of the three-dimensional image and the first image are spliced to obtain the first planar image. Similarly, the second spherical image is converted into a corresponding three-dimensional image, the three-dimensional image corresponding to the second spherical image including a forward mapping image, a leftward mapping image, a rightward mapping image, an upward mapping image and a downward mapping image of the second spherical image; the forward mapping image, the leftward mapping image and the rightward mapping image of the three-dimensional image corresponding to the second spherical image are spliced to obtain a second image; and the upward mapping image and the downward mapping image of the three-dimensional image corresponding to the second spherical image and the second image are spliced to obtain the second planar image.

S1013: determine, according to the first planar image and the second planar image, feature point matching pairs corresponding to a plurality of spatial points in the spatial region where the terminal device is located to obtain a plurality of feature point matching pairs.

Feature points corresponding to a plurality of spatial points in the spatial region where the terminal device is located are extracted from the first planar image on the basis of a feature point extraction algorithm to obtain a plurality of third feature points; feature points corresponding to a plurality of spatial points in the spatial region where the terminal device is located are extracted from the second planar image on the basis of the feature point extraction algorithm to obtain a plurality of fourth feature points; and each of the plurality of third feature points is matched with one of the plurality of fourth feature points on the basis of a feature point matching algorithm to obtain a plurality of feature point matching pairs, one feature point matching pair including one third feature point and one fourth feature point. The feature point extraction algorithm and the feature point matching algorithm may be selected according to actual conditions, and are not specifically limited in embodiments of the disclosure. For example, the feature point extraction algorithm includes at least one of a Harris corner detection algorithm, a scale-invariant feature transform (SIFT) algorithm, a speeded-up robust features (SURF) algorithm, and a features from accelerated segment test (FAST) feature point detection algorithm; and the feature point matching algorithm includes at least one of a Kanade-Lucas-Tomasi (KLT) feature tracker algorithm and a brute-force matching algorithm.

S1014: generate, according to the plurality of feature point matching pairs and the target planar image, the first disparity map of the spatial region where the terminal device is located.

A disparity value of a corresponding target spatial point in the spatial region where the terminal device is located is generated on the basis of each of the plurality of feature point matching pairs; a pixel coordinate of each target spatial point on the target planar image is obtained; a color of the pixel point corresponding to the target spatial point on the target planar image is determined according to the disparity value of the corresponding target spatial point in the spatial region where the terminal device is located; and the first disparity map of the spatial region where the terminal device is located is generated according to the color of the pixel point corresponding to the target spatial point on the target planar image.

Figure 5:
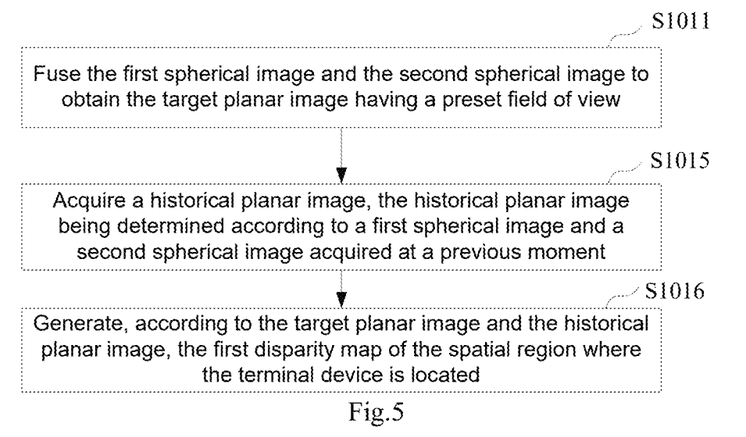
FIG. 5 is a schematic flow diagram of sub-steps of the depth map generation method in FIGS. 2.

In an embodiment, as shown in FIG. 5, after the sub-step S1011, the method further includes sub-steps S1015 and S1016.

S1015: acquire a historical planar image, the historical planar image being determined according to a first spherical image and a second spherical image acquired at a previous moment.

The first spherical image and the second spherical image acquired at the previous moment are obtained from a memory of the terminal device, and the first spherical image and the second spherical image acquired at the previous moment are fused to obtain the historical planar image; or the historical planar image is obtained from the memory of the terminal device. A time interval between the previous moment and a current moment may be set according to actual conditions, and is not specifically limited in embodiments of the disclosure. For example, a time interval between the previous time and the current time is set to be 0.1 s.

S1016: generate, according to the target planar image and the historical planar image, the first disparity map of the spatial region where the terminal device is located.

Feature points corresponding to a plurality of spatial points in the spatial region where the terminal device is located are extracted from the target planar image on the basis of a feature point extraction algorithm to obtain a plurality of fifth feature points; feature points corresponding to a plurality of spatial points in the spatial region where the terminal device is located are extracted from the historical planar image on the basis of the feature point extraction algorithm to obtain a plurality of sixth feature points; and each of the plurality of fifth feature points is matched with one of the plurality of sixth feature points on the basis of a feature point matching algorithm to obtain a plurality of feature point matching pairs, one feature point matching pair including one fifth feature point and one sixth feature point; and the first disparity map of the spatial region where the terminal device is located is generated according to the plurality of feature point matching pairs. By means of the target planar image and the historical planar image, a disparity map having a large field of view may be generated.

The feature point extraction algorithm and the feature point matching algorithm may be selected according to actual conditions, and are not specifically limited in embodiments of the disclosure. For example, the feature point extraction algorithm includes at least one of a Harris corner detection algorithm, a scale-invariant feature transform (SIFT) algorithm, a speeded-up robust features (SURF) algorithm, and a features from accelerated segment test (FAST) feature point detection algorithm; and the feature point matching algorithm includes at least one of a Kanade-Lucas-Tomasi (KLT) feature tracker algorithm and a brute-force matching algorithm.

In an embodiment, the first spherical image is converted into a first planar image having a preset field of view, and the second spherical image is converted into a second planar image having a preset field of view; and the first disparity map of the spatial region where the terminal device is located is generated according to the first planar image and the second planar image. A method of converting the first spherical image into a first planar image having a preset field of view may include: convert the first spherical image into a first three-dimensional image, and splice the forward mapping image, the leftward mapping image, the rightward mapping image, the upward mapping image and the downward mapping image of the first three-dimensional image to obtain the first planar image having a preset field of view. Similarly, the second spherical image is converted into a second three-dimensional image, and the forward mapping image, the leftward mapping image, the rightward mapping image, the upward mapping image and the downward mapping image of the second three-dimensional image are spliced to obtain the second planar image having a preset field of view. By means of the first planar image and the second planar image, the first disparity map of the spatial region where the terminal device is located is obtained, and efficiency and accuracy of generating the first disparity map by the terminal device are improved.

In an embodiment, a method of generating, according to the first planar image and the second planar image, a first disparity map of the spatial region where the terminal device is located may include: extract, on the basis of a feature point extraction algorithm, feature points corresponding to a plurality of spatial points in the spatial region where the terminal device is located from the first planar image to obtain a plurality of seventh feature points; extract, on the basis of the feature point extraction algorithm, feature points corresponding to a plurality of spatial points in the spatial region where the terminal device is located from the second planar image to obtain a plurality of eighth feature points; match each of the plurality of seventh feature points with one of the plurality of eighth feature points on the basis of a feature point matching algorithm to obtain a plurality of feature point matching pairs, one feature point matching pair including a seventh feature point and an eighth feature point; and generate the first disparity map of the spatial region where the terminal device is located according to the plurality of feature point matching pairs.

It should be noted that, the above plurality of methods of generating the first disparity map of the spatial region where the terminal device is located may each form the first disparity map of the spatial region where the terminal device is located, or may be combined to generate the first disparity map of the spatial region where the terminal device is located, which is not specifically limited in embodiments of the disclosure, and a more accurate first disparity map may be obtained through reasonable combination according to actual conditions.

S102: generate a second disparity map of the spatial region according to depth information of the spatial region acquired by the active depth sensor.

Operations of the active sensor include: actively send a light pulse or other light rays to a target object, then receive a reflected light pulse or other light rays, and obtain depth information of the target object according to the reflected light pulse or other light rays. The active sensor may be selected according to actual conditions, and is not specifically limited in the disclosure. For example, the active sensor may be selected from a time of flight (TOF) sensor, a laser radar (Lidar) sensor and a structured light sensor.

In an embodiment, the active sensor is controlled to emit a light pulse to the spatial region where the terminal device is located, receive a reflected light pulse, determine depth information of the spatial region according to a frequency and return time of the reflected light pulse, and obtain the second disparity map of the spatial region according to the depth information of the spatial region.

S103: generate a target depth map of the spatial region according to the first disparity map and the second disparity map.

In an embodiment, the first disparity map and the second disparity map are fused to obtain a target disparity map; and a target depth map of the spatial region where the terminal device is located is generated on the basis of the target disparity map. A method of fusing the first disparity map and the second disparity map to obtain the target disparity map may include: obtain a disparity value of each first pixel point in the first disparity map; obtain a disparity value of each second pixel point in the second disparity map; determine a target disparity value of each pixel point according to the disparity value of each first pixel point and the disparity value of each second pixel point; and generate the target disparity map on the basis of the target disparity value of each pixel point.

In an embodiment, a method of determining a target disparity value of each pixel point may include: acquire a computation formula of the target disparity value; and determine the target disparity value of each pixel point on the basis of the computation formula $d = w_T d_T + w_S d_S$ according to the disparity value of each first pixel point and the disparity value of each second pixel point. The computation formula is $d = w_T d_T + w_S d_S$, d is the target disparity value, $w_T$ is a weight of the disparity value of the first pixel point, $w_S$ is a weight of the disparity value of the second pixel point, $d_T$ is the disparity value of the first pixel point, $d_S$ is the disparity value of the second pixel point, and specific values of $W_T$ and $w_S$ may be set on the basis of actual conditions, and are not specifically limited in embodiments of the disclosure.

In an embodiment, a method of fusing the first disparity map and the second disparity map may include: acquire confidence of the disparity value of each pixel point in the first disparity map; acquire confidence of the disparity value of each pixel point in the second disparity map; filter pixel points in the first disparity map with the confidence less than preset confidence to obtain a first calibrated disparity map; filter pixel points in the second disparity map with the confidence less than the preset confidence to obtain a second calibrated disparity map; fuse the first calibrated disparity map and the second calibrated disparity map to obtain the target disparity map. The preset confidence may be set on the basis of actual conditions, and is not specifically limited in embodiments of the disclosure.

According to the depth map generation method provided in the above embodiments, the first disparity map of the spatial region where the terminal device is located is generated according to the first spherical image acquired by the first fisheye lens and the second spherical image acquired by the second fisheye lens; the second disparity map of the spatial region is generated according to depth information of the spatial region acquired by the active depth sensor; and the target depth map of the spatial region is generated according to the first disparity map and the second disparity map. In the above embodiments, since the fisheye lens have large fields of view, the first disparity map having a large field of view may be generated by means of the first spherical image acquired by the first fisheye lens and the second spherical image acquired by the second fisheye lens; the second disparity map may be generated by means of the depth information of the spatial region acquired by the active depth sensor; and finally a dense depth image having a large field of view may be generated on the basis of the first disparity map having a large field of view and the second disparity map, so as to improve the field of view of the depth map.

Figure 6:
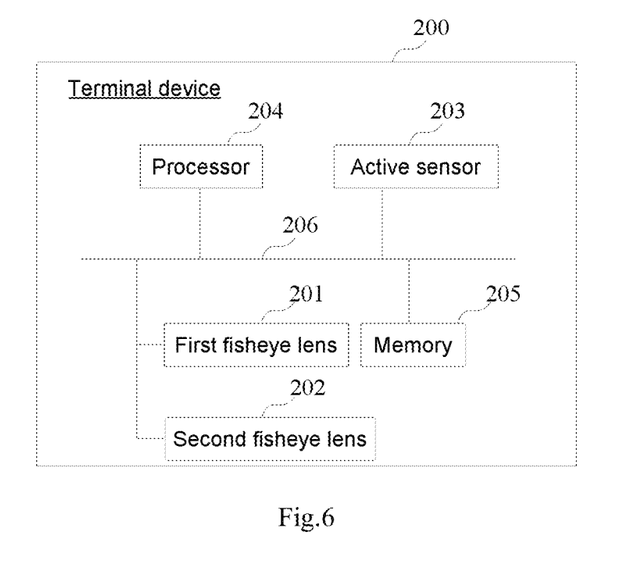
FIG. 6 is a schematic structural block diagram of a terminal device provided in an embodiment of the disclosure.

With reference to FIG. 6, a schematic structural block diagram of a terminal device provided in an embodiment of the disclosure is shown in FIG. 6.

As shown in FIG. 6, a depth map generation device 200 includes a first fisheye lens 201, a second fisheye lens 202, an active depth sensor 203, a processor 204 and a memory 205. The first fisheye lens 201, the second fisheye lens 202, the active depth sensor 203, the processor 204 and the memory 205 are connected to each other by means of a bus 206, for example, an inter-integrated circuit (I2C) bus.

Particularly, the processor 204 is configured to provide computation and control capabilities to support operations of the entire depth map generation device. The processor 204 may be a central processing unit (CPU), and the processor 204 may be another general purpose processor, a digital signal processor (DSP), an application specific integrated circuit (ASIC), a field-programmable gate array (FPGA) or other programmable logic devices, a discrete gate or transistor logic device, a discrete hardware assembly, etc. The general purpose processor may be a microprocessor, or the processor may be any conventional processor, etc.

Specifically, the memory 205 may be a flash chip, a read-only memory (ROM) disk, an optical disk, a universal serial bus flash disk, a mobile hard disk, etc.

Those skilled in the art can understand that the structure shown in FIG. 6 is merely a block diagram of part of the structure related to the solution of the disclosure, and does not constitute a limitation on the terminal device to which the solution of the disclosure is applied, and a specific server can include more or less components than those shown in the figure, or combine some components, or have different component arrangements.

The processor is configured to run a computer program stored in the memory, and implement any one of the depth map generation methods provided in embodiments of the disclosure when executing the computer program.

In an embodiment, the processor is configured to run the computer program stored in the memory, and implements steps as follows when executing the computer program:

generate, according to a first spherical image acquired by the first fisheye lens and a second spherical image acquired by the second fisheye lens, a first disparity map of a spatial region where the terminal device is located;

generate a second disparity map of the spatial region according to depth information of the spatial region acquired by the active depth sensor; and generate a target depth map of the spatial region according to the first disparity map and the second disparity map.

In an embodiment, when implementing the step of generating, according to a first spherical image acquired by the first fisheye lens and a second spherical image acquired by the second fisheye lens, a first disparity map of a spatial region where the terminal device is located, the processor is used for implementing steps as follows:

fuse the first spherical image and the second spherical image to obtain a target planar image having a preset field of view;

convert the first spherical image into a first planar image, and convert the second spherical image into a second planar image;

determine, according to the first planar image and the second planar image, feature point matching pairs corresponding to a plurality of spatial points in the spatial region where the terminal device is located to obtain a plurality of feature point matching pairs; and generate, according to the plurality of feature point matching pairs and the target planar image, the first disparity map of the spatial region where the terminal device is located.

In an embodiment, when implementing the step of fusing the first spherical image and the second spherical image to obtain a target planar image having a preset field of view, the processor is used for implementing steps as follows:

calibrate the first spherical image and the second spherical image; and fuse the first calibrated spherical image and the second calibrated spherical image to obtain the target planar image having a preset field of view.

In an embodiment, when implementing the step of fusing the first calibrated spherical image and the second calibrated spherical image to obtain the target planar image having a preset field of view, the processor is used for implementing steps as follows:

convert the first calibrated spherical image into a first three-dimensional image, the first three-dimensional image including a forward mapping image, a leftward mapping image, a rightward mapping image, an upward mapping image and a downward mapping image of the first calibrated spherical image;

convert the second calibrated spherical image into a second three-dimensional image, the second three-dimensional image including a forward mapping image, a leftward mapping image, a rightward mapping image, an upward mapping image and a downward mapping image of the second calibrated spherical image; and fuse the first three-dimensional image and the second three-dimensional image to obtain the target planar image having a preset field of view.

In an embodiment, when implementing the step of fusing the first three-dimensional image and the second three-dimensional image to obtain the target planar image having a preset field of view, the processor is used for implementing steps as follows:

splice the forward mapping image, the leftward mapping image and the rightward mapping image of the first three-dimensional image to obtain a first image having a preset field of view;

splice the forward mapping image, the leftward mapping image and the rightward mapping image of the second three-dimensional image to obtain a second image having a preset field of view;

fuse the first image and the second image to obtain a first fused image, and fuse the upward mapping image of the first three-dimensional image and the upward mapping image of the second three-dimensional image to obtain a second fused image;

fuse the downward mapping image of the first three-dimensional image and the downward mapping image of the second three-dimensional image to obtain a third fused image; and splice the first fused image, the second fused image and the third fused image to obtain the target planar image having a preset field of view.

In an embodiment, when implementing the step of calibrating the first spherical image and the second spherical image, the processor is used for implementing steps as follows:

convert the first spherical image into a third three-dimensional image, and convert the second spherical image into a fourth three-dimensional image;

determine, according to the third three-dimensional image and the fourth three-dimensional image, feature point matching pairs corresponding to a plurality of spatial points in the spatial region where the terminal device is located to obtain a plurality of feature point matching pairs.

In an embodiment, when implementing the step of converting the first spherical image into a first planar image, the processor is used for implementing steps as follows:

convert the first spherical image into a three-dimensional image, the three-dimensional image including a forward mapping image, a leftward mapping image, a rightward mapping image, an upward mapping image and a downward mapping image of the first spherical image;

splice the forward mapping image, the leftward mapping image and the rightward mapping image of the three-dimensional image to obtain a first image; and splice the upward mapping image and the downward mapping image of the three-dimensional image and the first image to obtain the first planar image.

In an embodiment, when implementing the step of fusing the first spherical image and the second spherical image to obtain the target planar image having a preset field of view, the processor is used for implementing steps as follows:

acquire a historical planar image, the historical planar image being determined according to a first spherical image and a second spherical image acquired at a previous moment; and generate, according to the target planar image and the historical planar image, the first disparity map of the spatial region where the terminal device is located.

It should be noted that those skilled in the art can clearly understand that for convenience and conciseness of description, the specific working process of the terminal device described above can be obtained with reference to the corresponding process in the foregoing embodiments of the depth map generation method, which is not repeated herein.

An embodiment of the disclosure further provides a storage medium. The storage medium is used for computer-readable storage, the storage medium stores one or more programs, and the one or more programs are capable of being executed by one or more processors, so as to implement steps of any one of the depth map generation methods provided in the description of the disclosure.

The storage medium may be an internal storage unit of the terminal device described in the foregoing embodiments, for example, a hard disk or a memory of the terminal device. The storage medium may be an external storage device of the terminal device, for example, a plug-in hard disk, a smart media card (SMC), a secure digital (SD) card, a flash card, etc. configured on the terminal device.

Those of ordinary skill in the art can understand that functional modules/units in all or some steps, systems and the apparatuses in the method disclosed above can be implemented as software, firmware, hardware and appropriate combinations thereof. In an embodiment of hardware, division between the functional modules/units mentioned in the above description does not certainly correspond to division of physical assemblies. For instance, a physical assembly can have a plurality of functions, or a function or step can be cooperatively executed by several physical assemblies. Some or all physical assemblies can be implemented as software executed by a processor, such as a central processing unit, a digital signal processor, or a microprocessor, or as hardware, or as an integrated circuit, such as an application specific integrated circuit. Such software may be distributed on a computer-readable medium, which can include a computer storage medium (or a non-transitory medium) and a communication medium (or a transitory medium). As well known to those of ordinary skill in the art, term "computer-storage medium" includes volatile, nonvolatile, removable and non-removable media implemented in any method or technology for storing information (such as a computer-readable instruction, a data structure, a program module or other data). The computer-storage medium includes, but is not limited to, a random-access memory (RAM), a read-only memory (ROM), an electrically erasable programmable read-only memory (EE-PROM), a flash memory or other memory technologies, a compact disk read-only memory (CD-ROM), a digital versatile disk (DVD) or other optical disk storages, a magnetic cassette, a magnetic tape, a magnetic disk storage or other magnetic storage apparatuses, or any other media that can be used to store desired information and can be accessed by a computer. In addition, it is well known to those of ordinary skill in the art that a communication medium generally contains a computer-readable instruction, a data structure, a program module or other data in, for example, a carrier wave or a modulated data signal of other transmission mechanisms, and can include any information delivery medium.

It should be understood that term "and/or" used in the description of the disclosure and appended claims refers to any combinations and all possible combinations of one or more of associated listed items, and includes these combinations. It should be noted that terms "include", "contain", or any other variations thereof herein are intended to cover non-exclusive inclusions, such that a process, a method, an object or a system including a series of elements not only includes those elements, but also includes other elements that are not explicitly listed, or further includes inherent elements of the process, the method, the object or the system. In the absence of more restrictions, an element defined by statement "including a . . . " does not exclude other same element in a process, a method, an object or a system that includes the element.

The above sequence numbers of embodiments of the disclosure are merely for description, and do not indicate advantages and disadvantages of the embodiments. What are described above are merely particular embodiments of the disclosure, and are not intended to limit the scope of protection of the disclosure. Various equivalent modifications or substitutions are readily conceivable to those skilled in the art within the scope of technology disclosed in the disclosure, and these modifications or substitutions should all fall within the scope of protection of the disclosure. Therefore, the scope of protection of the disclosure should be subject to a scope of protection of the claims.

What is claimed is:

1. A depth map generation method, applied to a terminal device, wherein the terminal device comprises a first fisheye lens, a second fisheye lens and an active depth sensor, and the method comprises:
   generating, according to a first spherical image acquired by the first fisheye lens and a second spherical image acquired by the second fisheye lens, a first disparity map of a spatial region where the terminal device is located;
   generating a second disparity map of the spatial region according to depth information of the spatial region acquired by the active depth sensor; and
   generating a target depth map of the spatial region according to the first disparity map and the second disparity map;
   wherein the generating, according to the first spherical image acquired by the first fisheye lens and the second spherical image acquired by the second fisheye lens, the first disparity map of the spatial region where the terminal device is located comprises:
   fusing the first spherical image and the second spherical image to obtain a target planar image having a preset field of view;
   converting the first spherical image into a first planar image, and converting the second spherical image into a second planar image;
   determining, according to the first planar image and the second planar image, feature point matching pairs corresponding to a plurality of spatial points in the spatial region where the terminal device is located to obtain a plurality of feature point matching pairs; and
   generating, according to the plurality of feature point matching pairs and the target planar image, the first disparity map of the spatial region where the terminal device is located.

2. The depth map generation method according to claim 1, wherein the fusing the first spherical image and the second spherical image to obtain the target planar image having a preset field of view comprises:
   calibrating the first spherical image and the second spherical image; and
   fusing the first calibrated spherical image and the second calibrated spherical image to obtain the target planar image having a preset field of view.

3. The depth map generation method according to claim 2, wherein the fusing the first calibrated spherical image and the second calibrated spherical image to obtain the target planar image having a preset field of view comprises:
   converting the first calibrated spherical image into a first three-dimensional image, the first three-dimensional image comprising a forward mapping image, a leftward mapping image, a rightward mapping image, an upward mapping image and a downward mapping image of the first calibrated spherical image;
   converting the second calibrated spherical image into a second three-dimensional image, the second three-dimensional image comprising a forward mapping image, a leftward mapping image, a rightward mapping image, an upward mapping image and a downward mapping image of the second calibrated spherical image; and
   fusing the first three-dimensional image and the second three-dimensional image to obtain the target planar image having a preset field of view.

4. The depth map generation method according to claim 3, wherein the fusing the first three-dimensional image and the second three-dimensional image to obtain the target planar image having a preset field of view comprises:
   splicing the forward mapping image, the leftward mapping image and the rightward mapping image of the first three-dimensional image to obtain a first image having a preset field of view;
   splicing the forward mapping image, the leftward mapping image and the rightward mapping image of the second three-dimensional image to obtain a second image having a preset field of view;
   fusing the first image and the second image to obtain a first fused image, and fusing the upward mapping image of the first three-dimensional image and the upward mapping image of the second three-dimensional image to obtain a second fused image;
   fusing the downward mapping image of the first three-dimensional image and the downward mapping image of the second three-dimensional image to obtain a third fused image; and
   splicing the first fused image, the second fused image and the third fused image to obtain the target planar image having a preset field of view.

5. The depth map generation method according to claim 2, wherein the calibrating the first spherical image and the second spherical image comprises:
   converting the first spherical image into a third three-dimensional image, and converting the second spherical image into a fourth three-dimensional image;
   determining, according to the third three-dimensional image and the fourth three-dimensional image, feature point matching pairs corresponding to a plurality of spatial points in the spatial region where the terminal device is located to obtain the plurality of feature point matching pairs;
   removing abnormal feature point matching pairs from the plurality of feature point matching pairs to obtain a plurality of target feature point matching pairs; and
   calibrating the first spherical image and the second spherical image according to the plurality of target feature point matching pairs.

6. The depth map generation method according to claim 1, wherein the converting the first spherical image into the first planar image comprises:
   converting the first spherical image into a three-dimensional image, the three-dimensional image comprising a forward mapping image, a leftward mapping image, a rightward mapping image, an upward mapping image and a downward mapping image of the first spherical image;

splicing the forward mapping image, the leftward mapping image and the rightward mapping image of the three-dimensional image to obtain a first image; and splicing the upward mapping image and the downward mapping image of the three-dimensional image and the first image to obtain the first planar image.

7. The depth map generation method according to claim 1, wherein after the fusing the first spherical image and the second spherical image to obtain a target planar image having a preset field of view, the method further comprises:
acquiring a historical planar image, the historical planar image being determined according to a first spherical image and a second spherical image acquired at a previous moment; and
generating, according to the target planar image and the historical planar image, the first disparity map of the spatial region where the terminal device is located.

8. A terminal device, comprising a first fisheye lens, a second fisheye lens, an active depth sensor, a processor, a memory, a computer program stored on the memory and capable of being executed by the processor, and a data bus configured to implement communication between the processor and the memory, wherein when the computer program is executed by the processor, cause the processor to implement steps of the depth map generation method as claimed in claim 1.

9. A Non-transitory storage medium, used for computer-readable storage, wherein the storage medium stores one or more programs, and the one or more programs are capable of being executed by one or more processors, so as to implement steps of the depth map generation method as claimed in claim 1.

10. A terminal device, comprising a first fisheye lens, a second fisheye lens, an active depth sensor, a processor, a memory, a computer program stored on the memory and capable of being executed by the processor, and a data bus configured to implement communication between the processor and the memory, wherein when the computer program is executed by the processor, cause the processor to implement steps of the depth map generation method as claimed in claim 2.

11. A terminal device, comprising a first fisheye lens, a second fisheye lens, an active depth sensor, a processor, a memory, a computer program stored on the memory and capable of being executed by the processor, and a data bus configured to implement communication between the processor and the memory, wherein when the computer program is executed by the processor, cause the processor to implement steps of the depth map generation method as claimed in claim 3.

12. A terminal device, comprising a first fisheye lens, a second fisheye lens, an active depth sensor, a processor, a memory, a computer program stored on the memory and capable of being executed by the processor, and a data bus configured to implement communication between the processor and the memory, wherein when the computer program is executed by the processor, cause the processor to implement steps of the depth map generation method as claimed in claim 4.

13. A terminal device, comprising a first fisheye lens, a second fisheye lens, an active depth sensor, a processor, a memory, a computer program stored on the memory and capable of being executed by the processor, and a data bus configured to implement communication between the processor and the memory, wherein when the computer program is executed by the processor, cause the processor to implement steps of the depth map generation method as claimed in claim 5.

14. A terminal device, comprising a first fisheye lens, a second fisheye lens, an active depth sensor, a processor, a memory, a computer program stored on the memory and capable of being executed by the processor, and a data bus configured to implement communication between the processor and the memory, wherein when the computer program is executed by the processor, cause the processor to implement steps of the depth map generation method as claimed in claim 6.

15. A terminal device, comprising a first fisheye lens, a second fisheye lens, an active depth sensor, a processor, a memory, a computer program stored on the memory and capable of being executed by the processor, and a data bus configured to implement communication between the processor and the memory, wherein when the computer program is executed by the processor, cause the processor to implement steps of the depth map generation method as claimed in claim 7.

16. A Non-transitory storage medium, used for computer-readable storage, wherein the storage medium stores one or more programs, and the one or more programs are capable of being executed by one or more processors, so as to implement steps of the depth map generation method as claimed in claim 2.

17. A Non-transitory storage medium, used for computer-readable storage, wherein the storage medium stores one or more programs, and the one or more programs are capable of being executed by one or more processors, so as to implement steps of the depth map generation method as claimed in claim 3.

* * * * *